United States Patent
Sanchez

(10) Patent No.: US 11,354,989 B1
(45) Date of Patent: Jun. 7, 2022

(54) ASSET TRACKING AND PROTECTION

(71) Applicant: Alarm.com Incorporated, Tysons, VA (US)

(72) Inventor: Juan Abellanas Sanchez, Washington, DC (US)

(73) Assignee: Alarm.com Incorporated, Tysons, VA (US)

(*) Notice: Subject to any disclaimer, the term of this patent is extended or adjusted under 35 U.S.C. 154(b) by 0 days.

(21) Appl. No.: 16/865,792

(22) Filed: May 4, 2020

Related U.S. Application Data

(63) Continuation of application No. 16/170,240, filed on Oct. 25, 2018, now Pat. No. 10,643,441.

(60) Provisional application No. 62/576,864, filed on Oct. 25, 2017.

(51) Int. Cl.
*G08B 13/14* (2006.01)
*H04W 4/029* (2018.01)
*G08B 21/24* (2006.01)

(52) U.S. Cl.
CPC ..... *G08B 13/1427* (2013.01); *G08B 13/1436* (2013.01); *G08B 21/24* (2013.01); *H04W 4/029* (2018.02)

(58) Field of Classification Search
CPC  G08B 13/1427; G08B 13/1436; G08B 21/24; H04W 4/029
USPC ...................................................... 340/686.6
See application file for complete search history.

(56) References Cited

U.S. PATENT DOCUMENTS

| | | |
|---|---|---|
| 9,525,971 B1 | 12/2016 | Vega et al. |
| 9,560,481 B1 | 1/2017 | Yocam et al. |
| 2008/0246656 A1 | 10/2008 | Ghazarian |
| 2010/0149030 A1* | 6/2010 | Verma ................ G08B 13/1436 342/357.64 |
| 2012/0258731 A1 | 10/2012 | Smith et al. |
| 2013/0090090 A1 | 4/2013 | Rivere |
| 2016/0085999 A1 | 3/2016 | Oppenheimer |
| 2017/0064504 A1 | 3/2017 | Jose |
| 2017/0171204 A1 | 6/2017 | Forood et al. |
| 2018/0014250 A1* | 1/2018 | de Barros Chapiewski ............... H04W 52/028 |
| 2018/0020407 A1 | 1/2018 | Emmanuel et al. |
| 2018/0025603 A1* | 1/2018 | Tyler ................ G08B 13/2462 340/572.1 |
| 2018/0114417 A1 | 4/2018 | Kerber et al. |
| 2018/0152809 A1 | 5/2018 | Mei et al. |

* cited by examiner

*Primary Examiner* — Hirdepal Singh
(74) *Attorney, Agent, or Firm* — Fish & Richardson P.C.

(57) ABSTRACT

A device that is configured to track an asset is disclosed. In one aspect, the device includes a radio module that generates proximity data that indicates a distance between the computing device and the device. The device includes a processor that compares the distance between the computing device and the device to a distance threshold. The processor determines that the distance between the computing device and the device satisfies the distance threshold. The processor arms the device. The device includes a motion sensor that generates motion data. The processor compares the motion data to a motion threshold. The processor determines that the motion data satisfies the motion threshold. The processor activates an alarm state.

17 Claims, 7 Drawing Sheets

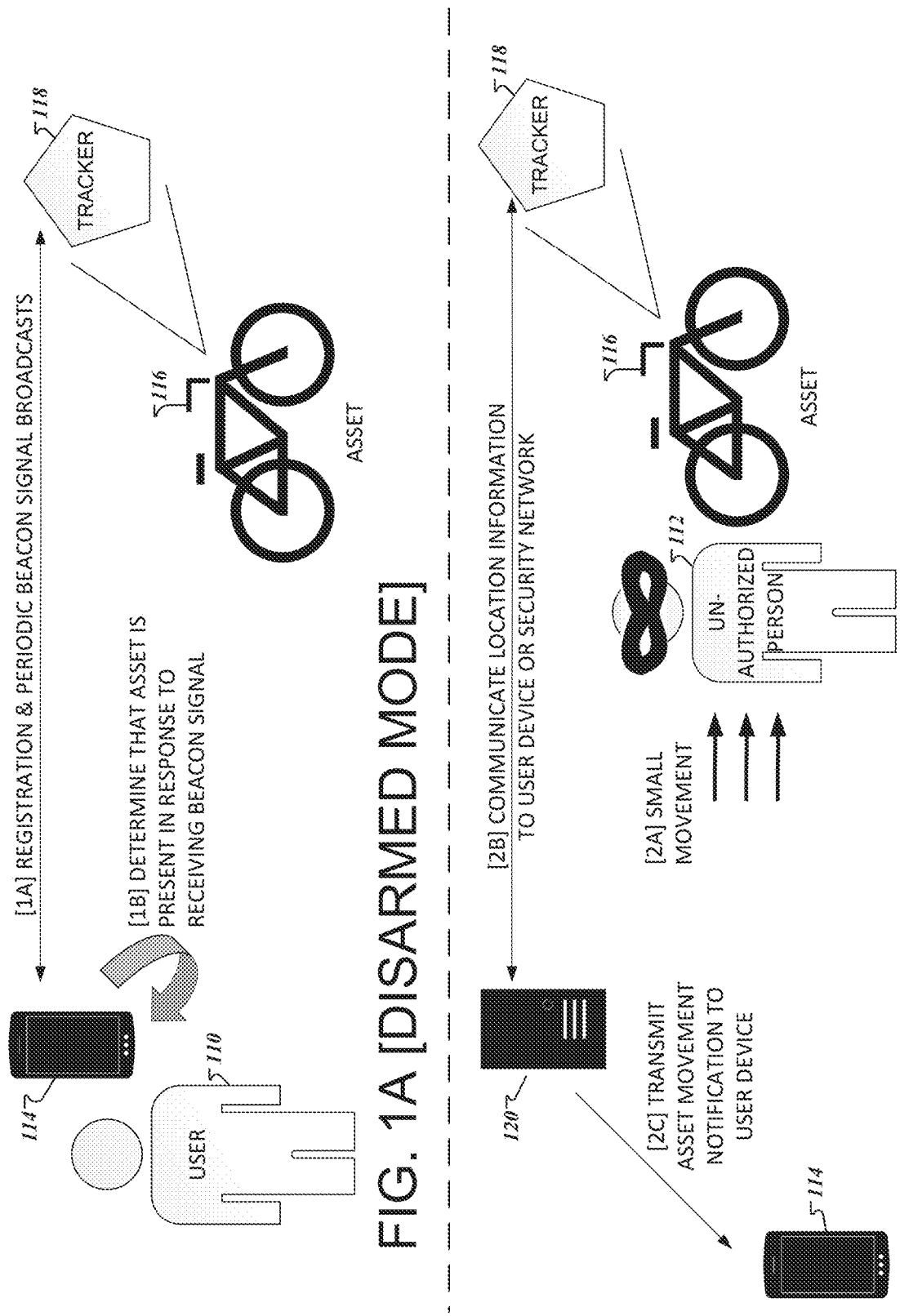

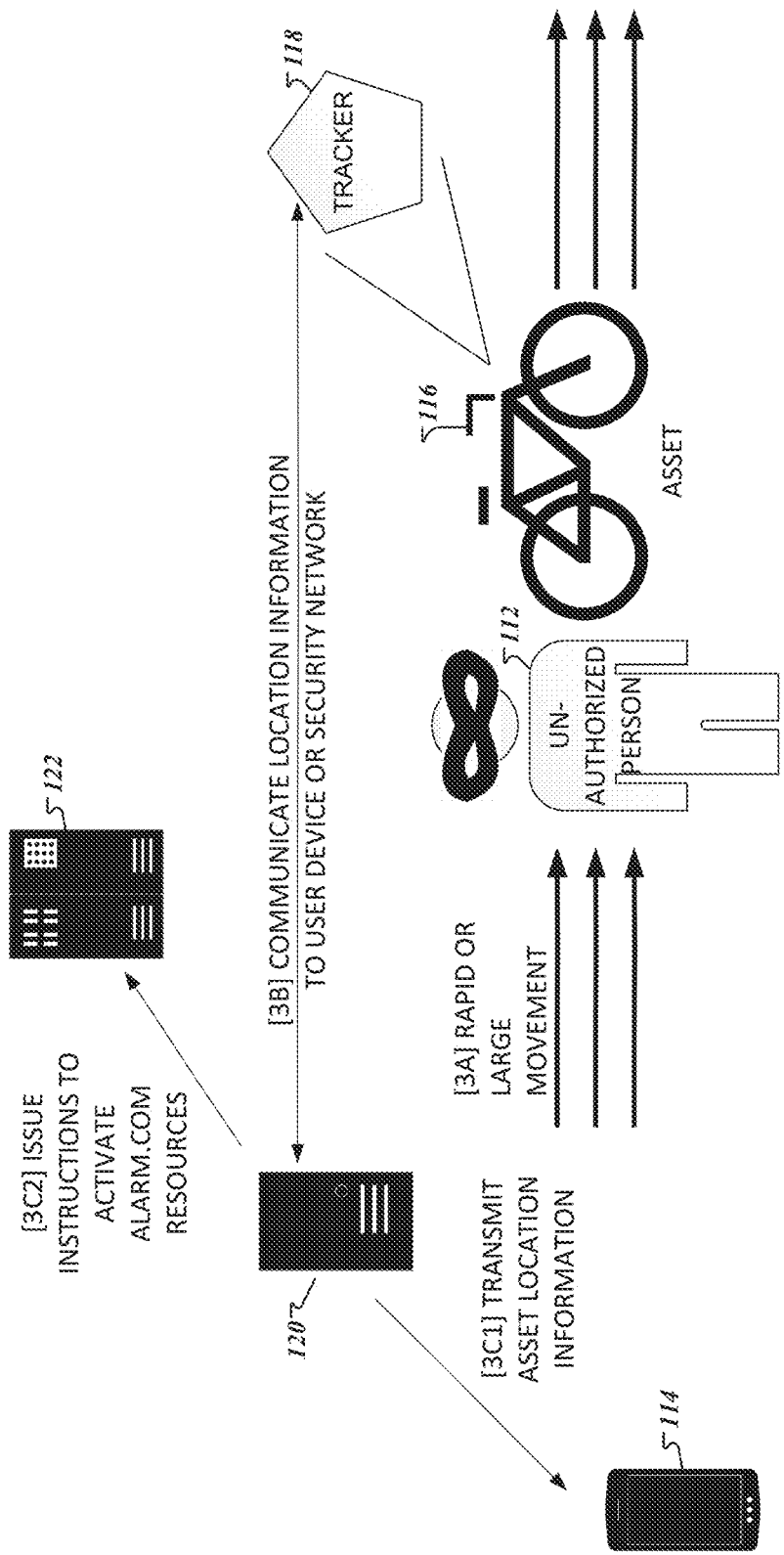
FIG. 1C [ALARM MODE]

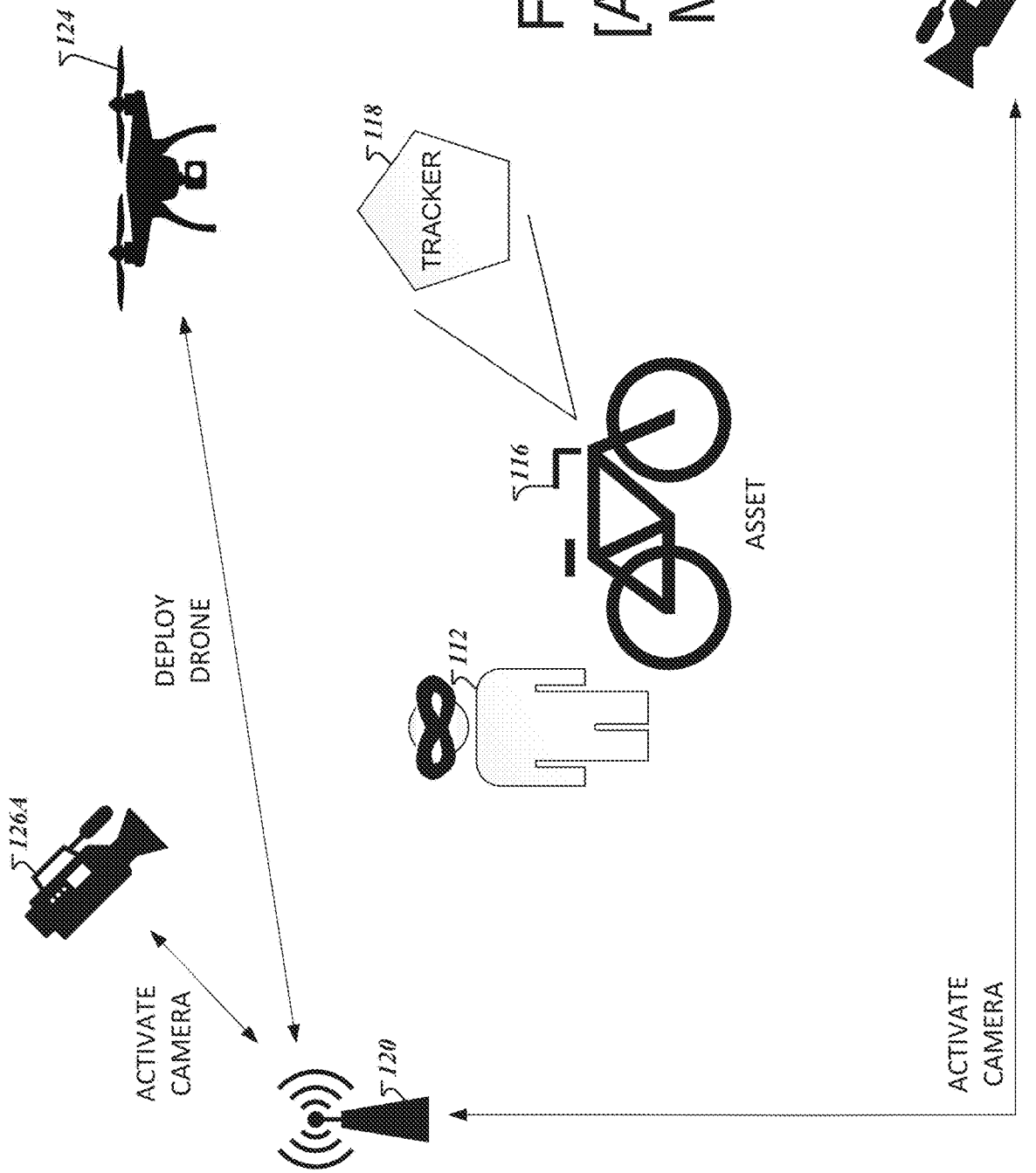

ASSET TRACKING AND PROTECTION

CROSS-REFERENCE TO RELATED APPLICATIONS

This application is a continuation of U.S. application Ser. No. 16/170,240, filed Oct. 25, 2018, and issuing as U.S. Pat. No. 10,643,441, which claims the benefit of U.S. Provisional Application No. 62/576,864, filed Oct. 25, 2017. Both of these prior applications are incorporated by reference in their entirety.

FIELD

This disclosure generally relates to wireless security systems and methods.

BACKGROUND

Valuable assets are constantly a target for theft, and thieves are frequently finding ways to evade being caught. Smarter systems are needed to alert asset owners of any tampering or theft of their assets.

SUMMARY

This disclosure generally describes systems and methods for tracking and protecting assets. A tracker may be attached to an asset. The tracker may register itself with a user device and may be used to track movement of the asset. As long as the tracker is located within a threshold distance to the user device, the tracker remains in a disarmed mode and transmits or receives beacon signals to or from the user device. When the tracker is located at a distance greater than a threshold distance from the user device, the tracker operates in an armed mode and transmits data through a cellular network. In the armed mode, the tracker activates motion sensors to track the asset's movement, and periodically transmits the asset's location to the user device. If the asset returns to a location that is within the threshold distance from the user device, the tracker may return to operating in the disarmed mode.

If the asset remains at a distance greater than the threshold distance but the asset's movement is less than a particular movement threshold, the system may transmit a notification message to the user device indicating that a movement of the asset beyond the threshold distance is occurring. If the asset remains at a distance greater than the threshold distance and the asset moves at a high speed such that the asset's movement is greater than the particular movement threshold, the tracker may activate an alarm mode, and additional contingency measures may be taken to monitor the asset's movement. For example, additional sensors, cameras, or drones may be deployed and activated to track the asset's movement and obtain additional information regarding the asset's movement.

The asset tracking and protection methods and systems described in this specification offer a number of advantages. One advantage is that a user may be alerted in real time whenever a user's asset is moved more than a threshold distance away from the user without the user's knowledge. Another advantage is that a user may continuously monitor where the asset is located and the direction of the asset's movement even when the asset is not within the user's sight. Yet another advantage is that additional resources of a user's network or a security provider's network may be deployed to assist with tracking of the asset. These additional resources may provide additional information to a user regarding the movement of the asset or a visual image of an entity that may be involved with the movement of the asset.

According to an innovative aspect of the subject matter described in this application, a device is configured to track an asset. The device includes a radio module that is configured to communicate with a computing device; and based on communicating with the computing device, generate proximity data that indicates a distance between the computing device and the device. The device includes a processor that is configured to receive, from the radio module, the proximity data; compare the distance between the computing device and the device to a distance threshold; based on comparing the distance between the computing device and the device to the distance threshold, determine that the distance between the computing device and the device satisfies the distance threshold; and, based on determining that that the distance between the computing device and the device satisfies the distance threshold, arm the device; a motion sensor that is configured to activate based on arming the device; and generate motion data. The processor is configured to compare the motion data to a motion threshold; based on comparing the motion data to a motion threshold, determine that the motion data satisfies the motion threshold; and, based on determining that the motion data satisfies the motion threshold, activate an alarm state.

This implementation and other implementations may include one or more of the following optional features. The radio module that is configured to, based on communicating with the computing device, generate additional proximity data that indicates an additional distance between the computing device and the device. The processor is configured to receive, from the radio module, the additional proximity data; compare the additional distance between the computing device and the device to the distance threshold; based on comparing the additional distance between the computing device and the device to the distance threshold, determine that the additional distance between the computing device and the device does not satisfy the distance threshold; and based on determining that that the additional distance between the computing device and the device does not satisfy the distance threshold, set the device to an unarmed state. The motion sensor is configured to deactivate based on the device being in an unarmed state. The motion sensor is configured to generate additional motion data.

The processor is configured to compare the additional motion data to the motion threshold; based on comparing the additional motion data to the motion threshold, determine that the additional motion data does not satisfy the motion threshold; and based on determining that the additional motion data does not satisfy the motion threshold, maintain the device in the armed state. The processor is configured to compare the additional motion data to an additional motion threshold; based on comparing the additional motion data to the additional motion threshold, determine that the additional motion data satisfies the additional motion threshold; and based on determining that the additional motion data satisfies the additional motion threshold, generate a notification indicating movement of the asset. The radio module is configured to transmit the notification indicating the movement of the asset. The device further includes a GPS receiver that is configured to generate location data based on the device being in an alarm state. The radio module is configured to transmit the location data. The processor is configured to generate a request to deploy a drone and the location data. The radio module is configured to transmit the request to deploy a drone and the location data. The processor is configured to generate a request activate a camera in a vicinity of the device and the location data.

The radio module is configured to transmit the request to activate a camera in a vicinity of the device and the location data. The processor is configured to determine that, based on the location data, a location of the device is not changing; and, based on determining that the location of the device is not changing, deactivate the GPS receiver and maintain the motion sensor in an active state. The radio module is configured to, based on communicating with the computing device, generate additional proximity data that indicates an additional distance between the computing device and the device. The processor that is configured to receive, from the radio module, the additional proximity data; compare the additional distance between the computing device and the device to the distance threshold; and, based on comparing the additional distance between the computing device and the device to the distance threshold, determine that the distance between the computing device and the device does not satisfy the distance threshold. The radio module is configured to receive an instruction to arm the device. The processor is configured to receive the instruction to arm the device; and, based on the instruction to arm the device, arm the device. The radio module is configured to communicate using a short range radio or a cellular radio.

According to another innovative aspect of the subject matter described in this application, a method for tracking an asset includes the actions of communicating, by a radio module of a device that is configured to track an asset, with a computing device; based on communicating with the computing device, generating, by the radio module of the device, proximity data that indicates a distance between the computing device and the device; based on the proximity data that indicates the distance between the computing device and the device, comparing, by a processor of the device, the distance between the computing device and the device to a distance threshold; based on comparing the distance between the computing device and the device to a distance threshold, determining, by the processor of the device, that the distance between the computing device and the device satisfies the distance threshold; based on determining that that the distance between the computing device and the device satisfies the distance threshold, arming, by the processor of the device, the device; based on arming the device, activating, by the processor of the device, a motion sensor of the device; receiving, by the processor of the device, motion data generated by the motion sensor; comparing, by the processor of the device, the motion data to a motion threshold; based on comparing the motion data to a motion threshold, determining, by the processor of the device, that the motion data satisfies the motion threshold; and based on determining that the motion data satisfies the motion threshold, activating, by the processor of the device, an alarm state.

This implementation and other implementations may include one or more of the following optional features. The actions further include, based on communicating with the computing device, generating, by the radio module of the device, additional proximity data that indicates an additional distance between the computing device and the device; comparing, by the processor of the device, the additional distance between the computing device and the device to the distance threshold; based on comparing the additional distance between the computing device and the device to the distance threshold, determining, by the processor of the device, that the additional distance between the computing device and the device does not satisfy the distance threshold; based on determining that that the additional distance between the computing device and the device does not satisfy the distance threshold, setting, by the processor of the device, the device to an unarmed state; and based on the device being in an unarmed state, deactivating, by the processor of the device, the motion sensor.

The actions further include generating, by the motion sensor of the device, additional motion data; comparing, by the processor of the device, the additional motion data to the motion threshold; based on comparing the additional motion data to the motion threshold, determining, by the processor of the device, that the additional motion data does not satisfy the motion threshold; and, based on determining that the additional motion data does not satisfy the motion threshold, maintaining, by the processor of the device, the device in the armed state. The actions further include comparing, by the processor of the device, the additional motion data to an additional motion threshold; based on comparing the additional motion data to the additional motion threshold, determining, by the processor of the device, that the additional motion data satisfies the additional motion threshold; based on determining that the additional motion data satisfies the additional motion threshold, generating, by the processor of the device, a notification indicating movement of the asset; and transmitting, by the radio module of the device, the notification indicating the movement of the asset. The actions further include generating, by a GPS receiver of the device, location data based on the device being in an alarm state; and transmitting, by the radio module of the device, the location data. The actions further include generating, by the processor of the device, a request to deploy a drone and the location data; and transmitting, by the radio module of the device, the request to deploy a drone and the location data.

The actions further include generating, by the processor of the device, a request activate a camera in a vicinity of the device and the location data; and transmitting, by the radio module of the device, the request to activate a camera in a vicinity of the device and the location data. The actions further include determining, by the processor of the device, based on the location data, a location of the device is not changing; and, based on determining that the location of the device is not changing, deactivating, by the processor of the device, the GPS receiver and maintaining the motion sensor in an active state. The actions further include, based on communicating with the computing device, generating, by the radio module of the device, additional proximity data that indicates an additional distance between the computing device and the device; comparing, by the processor of the device, the additional distance between the computing device and the device to the distance threshold; based on comparing the additional distance between the computing device and the device to the distance threshold, determining, by the processor of the device, that the distance between the computing device and the device does not satisfy the distance threshold; receiving, by the radio module of the device, an instruction to arm the device; and, based on the instruction to arm the device, arming, by the processor of the device, the device. The radio module is configured to communicate using a short range radio or a cellular radio.

Other implementations include corresponding systems, apparatus, computer-readable storage media, and computer programs configured to implement the actions of the above-noted methods.

The details of one or more implementations are set forth in the accompanying drawings and the description below.

Other features and advantages will become apparent from the description, the drawings, and the claims.

BRIEF DESCRIPTION OF THE DRAWINGS

FIGS. 1A-1D depict example asset-tracking scenarios.

Like reference numbers and designation in the various drawings indicate like elements.

DETAILED DESCRIPTION

Figure 2:
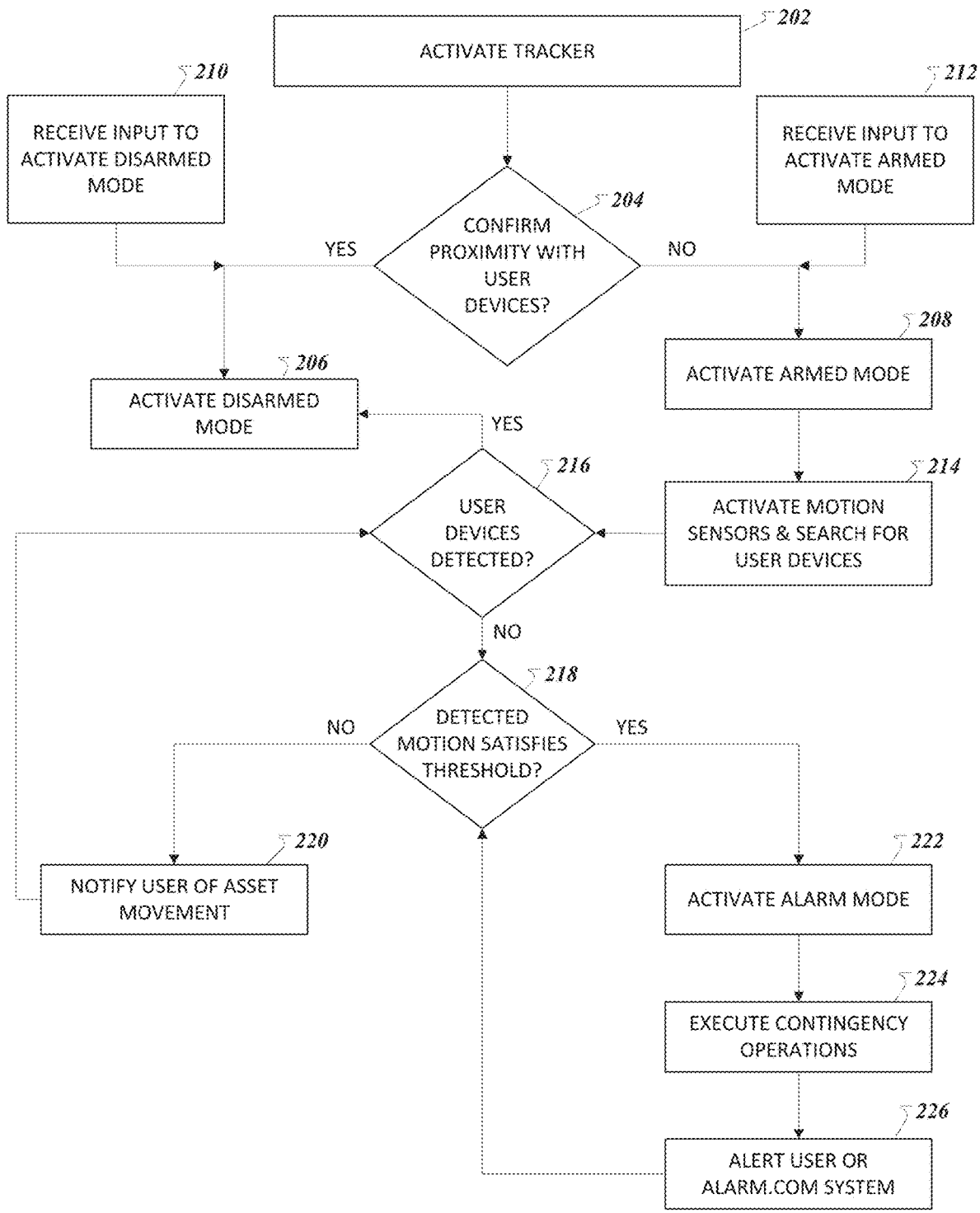
FIG. 2 depicts an example flowchart of an asset tracking method.

FIGS. 1A-1D depict example asset-tracking scenarios. FIG. 1A illustrates an example of a tracker operating in a disarmed mode. In FIG. 1A, a user 110 may have a user device 114 and an asset 116. Although the illustration depicts the asset 116 as a bicycle, an asset 116 may be any possession of the user 110. For example, the asset may be a paper, envelope, automobile, electronic device, and, in general, any physical item owned or possessed by user 110.

The asset 116 may have a tracker 118 attached to it. The tracker 118 may be attached to the asset 116 through any suitable method. For example, the tracker 118 may be attached by a screw, glue, Velcro, clamps, or any other method that allows the tracker 118 to be fixed to the asset 116. In some implementations, the tracker 118 may be attached and protected by a security box or cover so that the tracker 118 cannot be tampered with or removed from the asset 116. In general, any suitable way of protecting the tracker 118 from being removed or tampering may be used.

When the tracker 118 is attached to the asset 116, the tracker 118 may communicate and register itself with the user device 114 or a security network, such as the Alarm-.com security network (1A). In addition, the tracker 118 may communicate with the user device 114 and establish a two-way communication channel such that the tracker 118 may periodically transmit or receive beacon signals to or from the user device 114 through a short-range wireless network, such as a Bluetooth network. The process for registering the tracker 118 and establishing a communication channel with user device 114 is described further with respect to FIG. 2. When the tracker 118 receives a beacon signal from the user device 114 or a response to a beacon signal emitted by the tracker 118 from the user device 114, the tracker 118 may determine that the asset 116 is within a threshold distance of the user 110 or within a safe zone (1B). The tracker 118 may continue to operate in a disarmed mode and listen for or transmit beacon signals until a time when no more beacon signals or responses to beacon signals are received.

One example of a scenario in which no more beacon signals or responses to beacon signals are received by the tracker 118 is when an unauthorized person 112, such as a thief, attempts to steal or move the asset 116, as illustrated in FIG. 1B. The unauthorized person 112 may move the asset 116 until the asset 116 is beyond a threshold distance from the user (2A). When the tracker 118 no longer receives beacon signals or responses to beacon signals because the asset 116 is located beyond the threshold distance of the user 110, the tracker 118 may activate cellular radios and antennas and enter an armed mode of operation. The tracker 118 may then begin transmitting an alarm message that includes the asset 116's location information to the user device 114 or a security network server by communicating through the one or more towers 120 of a cellular network (2B), as shown in FIG. 1B, which illustrates an example of the tracker 118 operating in an armed mode. In some cases, the tracker 118 may simultaneously listen for beacon signals while transmitting the cellular signal in case the asset 116 returns within the safe zone. If the movement of the asset 116 is less than a movement threshold such as a displacement threshold or speed threshold, the tracker 118 may remain in an armed mode and continue to periodically transmit alarm messages with updated location information of the asset 116. If the movement of the asset 116 is greater than the movement threshold (3A), the tracker 118 may activate an alarm mode as shown in FIG. 1C, continue to periodically transmit alarm messages to the user device 114 with updated location information of the asset 116 (3B) (3C), and activate one or more resources of the security network to monitor the movement of the asset 116 (3D). In some cases, the security network may activate additional resources upon receiving a request by a user 110 who received the alarm message through user device 114. The one or more resources of the security network may include one or more sensors, such as cameras 126A, 126B, and a drone 124.

FIG. 1D illustrates an example of the resources deployed in the alarm mode. The security network may determine a likely location of the asset 116 according to coordinates provided in the location information received in the alert message, and activate one or more cameras 122A, 122B that the security network has deployed in a region where the asset 116 is likely located. In some cases, the security network may deploy a drone 124 and direct the drone 124 to a likely location of the asset 116. Cameras 122A, 122B or a camera on the drone 124 may capture video information and transmit the captured video information back to a server of the security network or the user device 114. The video information may be transmitted back to the user device 114 or security network using any suitable method, for example, by transmitting the video information through a cellular network tower 120. With the additional information provided by the network sensors, e.g., cameras, and the location information periodically transmitted by the tracker 118, the user or an agent of the security network may have more information to track down the movement of the asset 116 and attempt to repossess the asset 116.

It should be understood that the scenarios depicted in FIGS. 1A-1D are some of many possible scenarios involving the unanticipated or unauthorized movement of a user's asset. Another example scenario may arise when the user 110 begins to move away from asset 116 and is no longer within a threshold distance of the asset 116. In general, various types of assets may be monitored and tracked, and various types of resources may be utilized to track the asset. The security network may be a security network operated by a company or organization such as, for example, Alarm.com, or may be a network of devices controlled by an individual such as an owner of the asset.

FIG. 2 depicts an example flowchart of an asset tracking method. Initially, a tracker may be attached to an asset and activated (202). As part of the activation, the tracker and the asset may be registered with a security network. Tracker registration may include storing data indicative of one or more of a tracker identification (ID), model information, version information, manufacturer information, a serial number, and a network address of the tracker. Asset registration may include storing data indicative of one or more of an asset ID, asset model information, asset version information, asset manufacturer information, a serial number, and a network address of the asset. The asset and tracker registration information may be stored in a database associated with the security network.

In some implementations, the user may be provided with controls during registration allowing the user to elect if and when location information of the asset may be collected. Any user data collected may be treated in one or more ways before it is stored or used, so that personally identifiable information is removed and the collected data satisfies the user's selections. Thus, the user may have control over what information is collected, how that information is used, and what information is provided to the user.

The activation of the tracker also includes establishing one or more wireless network connections between the tracker and one or more user devices. The user, or owner of the asset, may have one or more user devices, which may include, for example, a smart phone, a laptop, an electronic pad, a smart watch, a fitness band, a smart television (TV), a desktop, a personal digital assistant, a mobile audio or video player, a game console, or a combination of one or more of these devices. In general, the user device may be a wired or wireless device capable of executing wireless communications with the tracker. To establish a wireless connection with a user device, the tracker and user device may exchange network ID information such as an Internet Protocol (IP) address, a Media Access Control (MAC) address, and any other information such as encryption/decryption keys or passwords to wirelessly connect with each other.

In general, the tracker and one or more user devices may be connected through any suitable short-range wireless network, such as a WiFi network, a Bluetooth network, a Zigbee network, or an infrared network, and may implement corresponding protocols to connect with one another. In some implementations, after connecting with one or more user devices and registering itself with a security network, the tracker may receive ownership information indicative of an owner of the asset. The ownership information may be received from the security network or from the user device. In some implementations, the communications protocol used for communications between a user device and the tracker may specify whether a user device or the tracker is to transmit periodic beacon signals.

After being activated, the tracker confirms the presence of the one or more user devices near the tracker (204). In some implementations, the tracker may periodically transmit beacon signals over the short-range wireless network to the one or more user devices and wait to receive a response from the one or more user devices in order to confirm the proximity of at least one user device. If a response is received from at least one user device, the tracker determines that the asset is still is located in proximity with a user device or a location within a user's safe zone. The tracker may then activate a disarmed mode (206). In the disarmed mode, the tracker may periodically confirm the presence of the one or more user devices near the tracker as described above (204).

In some implementations, the tracker may operate in a listening mode and receive periodic beacon signals from at least one of the one or more user devices. By receiving the periodic signals, the tracker may determine that at least one user device is still within a threshold distance of the tracker, and that the asset is still located in proximity with a user device or a location within a user's safe zone. The tracker may then determine that the asset is located in proximity with a user device or a location within a user's safe zone, and may activate a disarmed mode (206). The determined threshold distance may depend on the wireless network communication protocol being used by the tracker and user device for communication, and may be, for example, 10 feet or 20 feet.

If the tracker does not receive a beacon signal or a response to a transmitted beacon signal, the tracker may determine that the asset is no longer located in proximity with a user device and is located outside a user's safe zone. The tracker may then activate an armed mode (208). In response to activating the armed mode, the tracker may activate one or more sensors on the asset or the tracker, such as motion sensors, and may continue searching for user devices (214). The activated sensors may include one or more of a gyroscope, an accelerometer, a haptic feedback sensor, a passive infrared sensor, a radar, a vibration sensor, an optical sensor, a microwave sensor, and in general, any detector that senses motion of the asset. In some implementations, the tracker may also continue to broadcast beacon signals or listen for beacon signals to determine if any user devices are detected within a threshold distance of the tracker (216).

As noted above, if the tracker receives a beacon signal or receives a response to a beacon signal transmitted by the tracker, the tracker may determine that the user device has moved back to an area that is within a determined threshold distance of the tracker or a location within a user's safe zone. In some cases, the tracker may then deactivate the armed mode and activate a disarmed mode (206). In some cases, the user may select a control to enable or disable the tracker's ability to deactivate the armed mode.

If no beacon signal or response to a beacon signal is received, the tracker may process data received from the motion sensors. The processing may include determining one or more of a direction of the asset movement, a physical displacement of the asset, a speed of the asset movement, an acceleration of the asset movement, and, in general, any movement of the asset. In addition, the tracker may determine the current location of the asset. In general, any suitable location determining service may be used to determine the asset's location. For example, a Global Navigation Satellite System (GNSS) receiver or a Global Positioning System (GPS) receiver, or a General Packet Radio Service (GPRS) receiver included in the tracker may be used to determine the location of an asset attached to the tracker.

The tracker may compare the amount of movement detected by the motion sensors with one or more thresholds (218). If the amount of movement is less than a first motion threshold, the tracker may transmit a message notifying the user device of the asset's movement (220). The notification may indicate one or more of an amount of movement, a current location of the asset at the time the notification is transmitted, and a direction of the asset's movement. The notification may be transmitted using any suitable cellular communication protocol, such as GSM voice calls, SMS, EMS, or MMS messaging, CDMA, TDMA, PDC, WCDMA, CDMA2000, LTE, or GPRS, among others. After transmitting the message (220), the tracker may broadcast beacon signals or listen for beacon signals to determine if any user devices are detected within the threshold distance of the tracker (216).

The one or more motion thresholds may be set by an asset owner or by a security network administrator. The thresholds may include directional thresholds, physical displacement thresholds, or speed thresholds. The first motion threshold may be a threshold that, when satisfied or exceeded, indicates that the asset is likely moving away from the user at a rapid rate. For instance, in some implementations, if the movement of the asset indicates that the asset is moving at a high speed, high acceleration, or has a significantly large physical displacement from the user, the first motion threshold may be satisfied.

When the amount of movement is greater than or equal to the first motion threshold, the tracker activates an alarm mode (222). Activating the alarm mode triggers the execution of one or more contingency operations (224). In some implementations, the tracker may send a message (226) to a server of the security network, e.g., the Alarm.com network, that includes a location of the asset when the alarm mode is activated and an alert that the asset is moving at a high rate. The security network may then activate one or more resources of the security network to support the tracking of the asset. For example, the security network may activate one or more cameras at or around the location of the asset so that additional resources can be utilized to track the asset.

In some cases, by utilizing the additional resources, the security network may obtain information that indicates the type of activity or individuals involved in the movement of the asset. For instance, in some cases, the additional resources may identify an entity such as a person or vehicle other than the asset owner or owner's vehicle that are moving the asset. In some cases, the additional resources may confirm that the asset owner is moving the asset. In some cases, the additional resources may indicate additional conditions, e.g., flooding, associated with the movement of the asset. In some implementations, the security network may deploy a drone to the location of the asset. The drone may obtain images from an aerial view and track the asset. Information obtained by the additional resources may help to continue tracking the asset until the asset is repossessed by the user.

In some implementations, a user may send a deactivate command to the tracker through the cellular network or the security network. Upon receiving the deactivate command, the tracker may interact with the user device to execute the deactivate command. For example, if the asset is a bicycle, the deactivate command may be a command to lock the breaks in the bicycle so that the bicycle wheels can no longer move. If the asset is a car, the deactivate command may be a command to cease power to the engine so that the car's engine cannot support movement of the car. If the asset is an envelope, the deactivate command may be a command to activate a destruction mechanism. The destruction mechanism may trigger a fire ignition or chemical reaction that may result in the destruction of the asset. In general, various types of deactivate commands may be executed and may vary based on the type of asset.

In some implementations, after alerting the user by sending a message (226), the tracker may continue to monitor movement of the asset and compare the amount of movement detected by the motion sensors with one or more thresholds as described above (218). In some implementations, the tracking of the asset may continue until the user provides an input to reset the tracker to the disarm mode (210). In general, the user may provide an input through a user account accessible through an application or web browser executed on the user device to set the tracker to the armed mode (212) or disarmed mode (210) at any time. In the disarmed mode, the tracker may periodically broadcast beacon signals or listen for signals transmitted from user devices, as described above.

In operation 218, if the amount of movement is less than a first motion threshold but greater than zero, the tracker may transmit a message notifying the user device of the asset's movement (220). The tracker may continue to transmit location information and beacon signals, but the security network or user may not execute a contingency operation.

Figure 3:
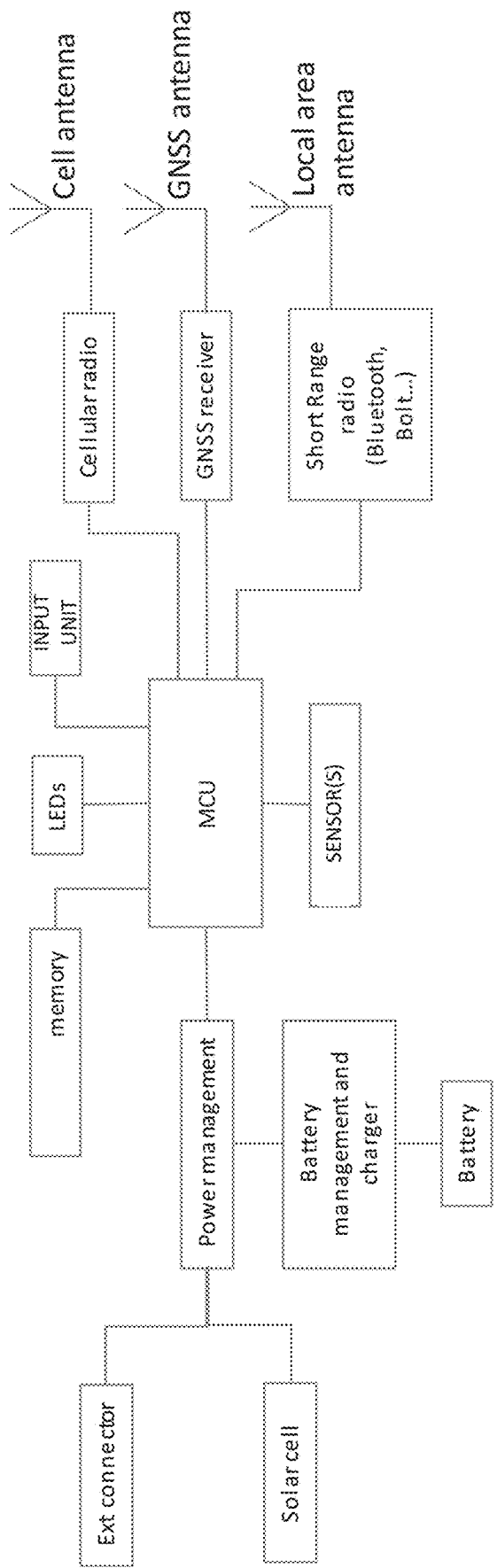
FIG. 3 depicts an example asset-tracking system.

FIG. 3 depicts an exemplary asset tracker. The tracker may include an external connector 302, a solar cell 304, a power management unit 306, a battery management and charger 308, a battery 310, a memory 312, one or more light emitting diodes (LEDs) 314, one or more sensors 318, a microcontroller unit (MCU) 316, input unit 320, a cellular radio 322, a GNSS receiver 324, a short range radio 326, a cell antenna 328, a GNSS antenna 330, and a local area antenna 332.

The external connector 302 may connect the tracker to any external device. The external connector 302 may include one or more ports such as a universal serial bus (USB), a serial port, a parallel port, a small computer systems interface (SCSI), IEEE 1394 port, PS/2 port, MIDI port, and a coaxial port. In some implementations, the external connector 302 may be connected to the asset, and may facilitate communications and data exchange between an asset and the tracker.

The solar cell 304 may include any suitable photovoltaic cell that converts solar energy intro electrical energy. The solar cell 304 may be formed using any suitable semiconductor material. The battery 310 may provide power to the tracker. Various suitable types of batteries may be used. The battery 310 may include any suitable type of electrochemical cell such as a wet cell or a dry cell. The battery 310 may be include zinc-carbon, zinc-chloride, nickel, lithium, mercury, magnesium, or any combination of these materials. The battery management and charger 308 may monitor the power levels of the battery, and charge the battery 310 using the solar cell 304 when the power level of the battery 310 drops below a particular power threshold. The power management unit 306 may manage power provided to different components of the tracker.

The memory 312 may be any suitable storage device configured to store data. The memory 312 may be volatile or non-volatile. The memory 312 may include one or more mass storage devices, for example, magnetic, magneto optical disks, optical disks, EPROM, EEPROM, flash memory devices, and may be implemented as internal hard disks, removable disks, or magneto optical disks. In some implementations, the memory 312 may include a non-tangible computer-readable storage medium that contains instructions, which when executed, perform one or more methods or portions of the methods described above.

As noted above, the one or more sensors 318 may include any suitable motion sensor such as a gyroscope, an accelerometer, a haptic feedback sensor, a passive infrared sensor, a radar, a vibration sensor, an optical sensor, or a microwave sensor. The input unit 320 may include one or more devices that are configured to receive one or more inputs. For example, the input unit 320 may include a touch pad, buttons, or keyboard for receiving alphanumeric text. The LEDs 314 may output a light signal in response to commands received from the MCU 316. In general, various suitable types of LEDs 314 may be used. In some implementations, the LEDs 314 may emit different types of light based on the type of mode the tracker is operating at. For example, the LEDs 314 may emit light having a particular color (e.g., red color) when the asset is in an alarm mode, and a different color (e.g., white) when the asset is in a disarm mode.

The cellular radio 322, GNSS receiver 324, short-range radio 326, cell antenna 328, GNSS antenna 330, and local area antenna 332 may each be used to communicate with external network devices. For example, the cellular radio 322 and cell antenna 328 may be used to perform cellular communications with devices on a cellular network. The GNSS receiver 324 and GNSS antenna 330 may be used to perform GNSS communications with devices on a GNSS network. Similarly, a short-range radio 326 and local area network may be used to perform communications with any suitable short-range network.

In general, the tracker may wirelessly communicate with a device over one or more networks to execute one or more operations of the method described in FIG. 2. For example, the tracker may transmit location information of the asset to a security network. The one or more networks may include access points, storage systems, cloud systems, modules, one or more databases including one or more media databases, and servers including one or more network servers. The one or more network servers may include any suitable computing device coupled to the one or more networks, including but not limited to a personal computer, a server computer, a series of server computers, a mini computer, and a mainframe computer, or combinations thereof. The one or more network servers may also include an application server, a web server, or a series of servers, running a network operating system, examples of which may include but are not limited to Microsoft® Windows® Server, Novell® NetWare®, or Linux®. The one or more network servers may be used for and/or provide cloud and/or network computing and media provision services. Although not shown in the figures, the server may have connections to external systems providing messaging functionality such as e-mail, SMS messaging, text messaging, and other functionalities, such as advertising services, search services, etc.

In some implementations, the one or more networks may include a cloud system that may provide Internet connectivity and other network-related functions. For example, the cloud system may provide storage services to store registration information of one or more user devices. The cloud system or one or more networks may also include one or more databases, which may include a media storage database, a media provision database, a cloud database, or a database managed by a database management system (DBMS). A DBMS may be implemented as an engine that controls organization, storage, management, and retrieval of data in a database. DBMSs frequently provide the ability to query, backup and replicate data, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

The MCU 316 may include one or more processors that control the components in the tracker. The one or more processors may include general or special purpose microprocessors. The one or more processors can execute one or more computer programs and process instructions for execution within the tracker to execute the operations described in this specification and instructions stored in the memory 312. The one or more processors may also include analog processors, digital processors, or both. The one or more processors may provide, for example, for coordination of the other components of the device, such as control of sensors 318, wireless communications by the tracker, and output of light or audio signals. Generally, the one or more processors may include various logic circuitry and programs to execute the various implementations described herein.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

Although not shown in FIG. 3, in some implementations, the tracker may include a speaker. The speaker may be configured to emit a particular sound when in the armed mode or the alarm mode. For example, the MCU 316 may instruct the speaker to emit a particular sound, such as a high pitch sound, at regular intervals when the tracker is in the alarm mode. The high pitch sound may help the asset stand out or be easily identified by a person in the vicinity of the asset.

Figure 3A:
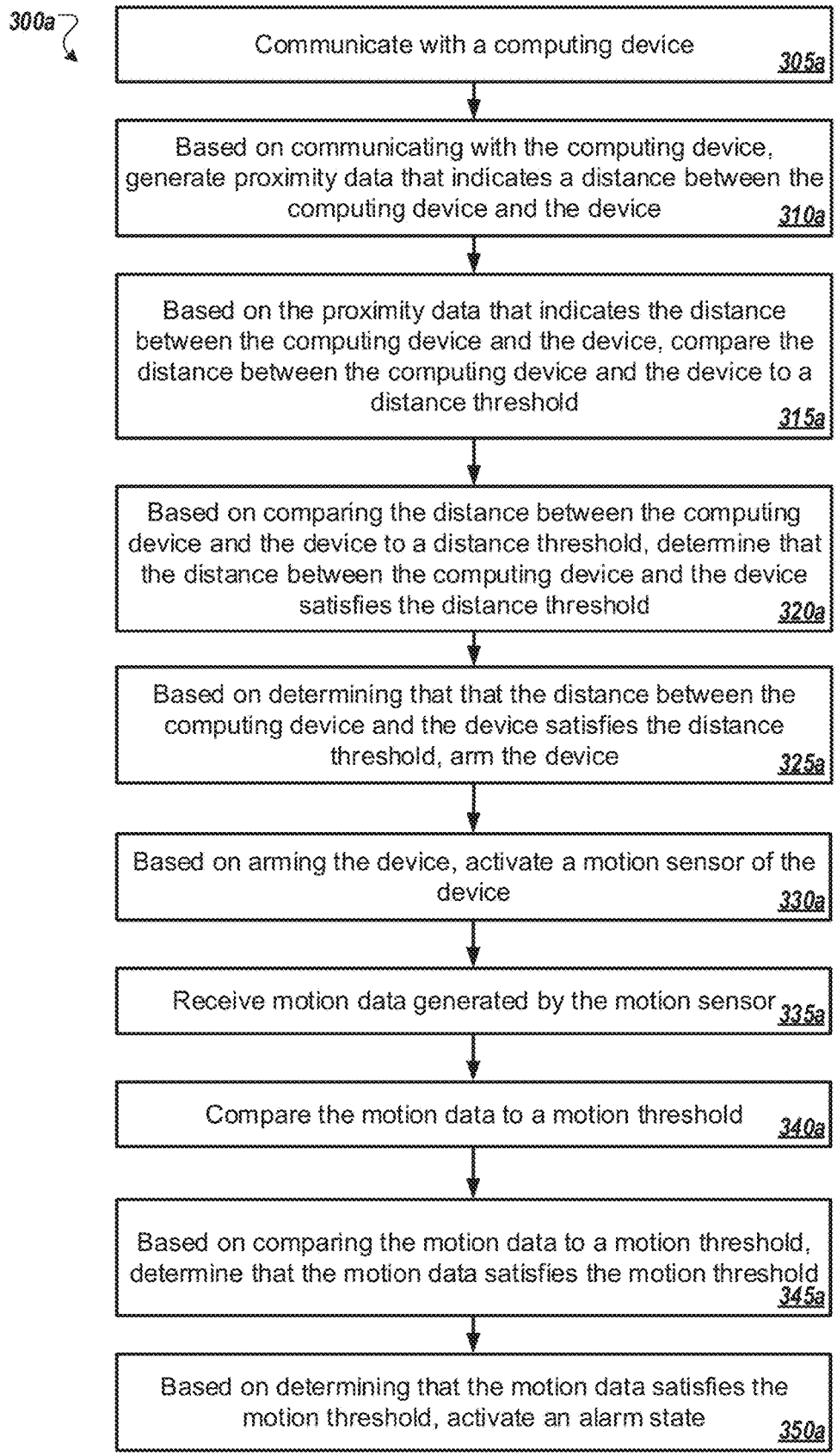
FIG. 3A is a flowchart of an example process for asset tracking.

FIG. 3A is a flowchart of an example process 300a for asset tracking. In general, the process 300a uses a device attached to an asset to track the asset. The device may provide location information to an owner of the asset in the event that the asset is moved while the device is armed. The process 300a will be described as being performed by a device that includes a processor and other components. An example of the device may be tracker 118 of FIGS. 1A-1D or the system of FIG. 3.

The device communicates, using a radio module, with a computing device (305a). In some implementations, the radio module communicates using a short range radio. The computing device may respond indicating that the device is within range of the device. The computing device may not respond if the device is too far from the computing device. The computing device may be a mobile phone, smart watch, wearable device, or any other similar computing device.

The device, based on communicating with the computing device, generates, using the radio module, proximity data that indicates a distance between the computing device and the device (310a). If the computing device does not respond, because, perhaps, the computing device is out of range of the device, the device may determine that the computing device is outside of a threshold distance.

The device, based on the proximity data that indicates the distance between the computing device and the device, compares the distance between the computing device and the device to a distance threshold (315a). The device may use the power of the signal received from the computing device to determine a distance between the device and the computing device. For example, the device may determine that the computing device is five meters from the device based on receiving a response signal of three decibel-millwatts. If the device does not receive a response, then the device may determine that the computing device is farther than the range for short range radio, e.g., thirty meters. The distance threshold may be set by a user. For example, the user may set the distance threshold to fifteen meters. The device compares the computed distance to the distance threshold.

The device, based on comparing the distance between the computing device and the device to a distance threshold, determines that the distance between the computing device and the device satisfies the distance threshold (320a). For example, the device may determine that the distance is twenty meters which is greater than the threshold of fifteen meters. In some implementations, the device may determine that the distance does not satisfy the distance threshold. For example, the device may determine that the distance is ten meters which is less than the distance threshold of fifteen meters.

The device, based on determining that that the distance between the computing device and the device satisfies the distance threshold, arms (325a). The device, based on arming the device, activates a motion sensor of the device (330a). The motion sensor may be an accelerometer, gyroscope, or any other sensor that is configured to detect movement. In instances where the distance does not satisfy the distance threshold, for example, the distance is ten meters and the distance threshold is fifteen meters, the device may remain unarmed.

In some implementations, the device may receive an instruction to arm from the computing device. For example, the owner may be going inside a store. The owner's bike with the device may be right outside the store and the owner's phone may be within range of the device, but the owner may not be able to see the bike. In this instance, the owner may request that the device arm.

The device receives motion data generated by the motion sensor (335a). For example, the accelerometer may generate motion data in response to a thief stealing the bike. The accelerometer may generate motion data in response to somebody bumping into the bike. The accelerometer may generate motion data in response to the bike falling over.

The device compares the motion data to a motion threshold (340a). The motion threshold may be set by the owner. The owner may not be worried about somebody bumping the asset and may only wish to prevent the asset from being stolen. In this case the owner may set the motion threshold higher than an owner who wants to prevent any contact with the asset.

The device, based on comparing the motion data to a motion threshold, determines that the motion data satisfies the motion threshold (345a). For example, the motion data may indicate that the device moved one meter and the motion threshold is ten centimeters. The device, based on determining that the motion data satisfies the motion threshold, activates an alarm state (350a). During the alarm state, the device may communicate with the computing device or another computer, e.g., a server, through a cellular radio. The device may activate a GPS receiver and transmit the location of the device to the other computer. In some implementations, the device may request deployment of a drone to track the location of the device. For example, the user may set the device to deploy the user's drone or a nearby drone when the device is in an alarm state. The device may communicate directly or through a server with the drone. The drone may use the GPS location of the device to track the device. In some implementations, the drone may be able to track the device through a short range radio when within range of the device. In some implementations, the drone may be able to communicate with the device through a cellular radio and track the device using that signal.

In some implementations, the device may use triangulation, e.g., using a cellular radio to generate location data. In some implementations, the device may be in an alarm state and not moving. In this instance, the device may transmit its GPS location and then deactivate the GPS receiver to preserve the battery. The device may reactivate the GPS receiver if the motion sensor detects motion greater than a motion threshold that may be preprogrammed or set by the user.

In some implementations, the device may continue to search for the computing device while in alarm mode. If the device detects the computing device using a short range radio, then the device may exit alarm mode. In some implementations, the device may not exit alarm mode until the user instructs the device to exit alarm mode. In this case, the user can confirm that the user is reunited with the asset. For example, a user may be near the user's bike, but the bike may be inside a locked building. In this instance, the user may want the device to remain armed so that the user can track the location of the bike in the event the bike moves before the bike is recovered.

While the device is in armed mode, the device may compare the motion to several different motion thresholds. The motion thresholds may be set by the user and may indicate the action that the device should take. For example, the user may set two thresholds. Motion below the first threshold, may be something similar to another person bumping into the bike. Bumping into a parked bike may be common if others are parking bikes nearby. In this case, the user may want to ensure that the user is not interrupted and the device is not armed in response to a bump. Above the first threshold and below the second threshold, may be something similar to the bike falling over. In this instance, the user may wish to be notified of the bike falling over, but there may not be a need to arm the device since it has not moved more than the second threshold. Motion above the second threshold may cause the device to enter alarm mode. The user may receive a notification when the device enters alarm mode also. In some implementations, the device may generate an audible alarm when in alarm mode. In some implementations, the device may be silent when in alarm mode. In some implementations, the device may generate an audible alarm when in alarm mode and when the device detects the computing device within a threshold distance that may be set by user or predetermined.

The user may configure the motion thresholds differently. Motion below a first threshold and above zero, or a near zero threshold, may trigger a notification to the user. Motion above the first threshold may cause the device to enter alarm mode. The user may not set an additional threshold.

In some implementations, the device may be in armed mode and continue to use the short range radio to search for the computing device. If the device communicates with the computing device and determines that the device is within the threshold distance, then the device may disarm. For example, if the device is armed and determines that the computing device is within twenty meters of the device, then based on a threshold distance of fifteen meters, the device may remain armed. If the device is armed and determines that the computing device is within ten meters of the device, then based on a threshold distance of fifteen meters, the device may disarm. In some implementations, the device may not disarm without an instruction from the computing device even if the computing device is within the threshold distance.

In some implementations, the device may transmit a request to activate nearby camera to generate image data when in alarm mode. The device may transmit location data upon activating alarm mode. The location data may be based on GPS data or triangulation data. The device may transmit location data periodically at a frequency specified by the user or dictated by the battery power or if the motion sensor detects a threshold level of motion. A sever may receive the location data and identify cameras that the server can received image data from. The cameras may be on a monitoring network accessible by the server. The server can request image data from the cameras near the location of the device. As the location of the device changes, the server may indicate that some cameras can deactivate and other camera should activate. The server may analyze the image data to determine whether any of the images include the device or the asset or both. The server may transmit the image data to the computing device of the user or another computing device. The user may indicate which images include the device or the asset or both. The server may use that information to activate additional cameras. In some implementations, the server may receive audio data form microphones, video data from video camera, or other types of data from other sensors that may be accessible to the server.

Figure 4:
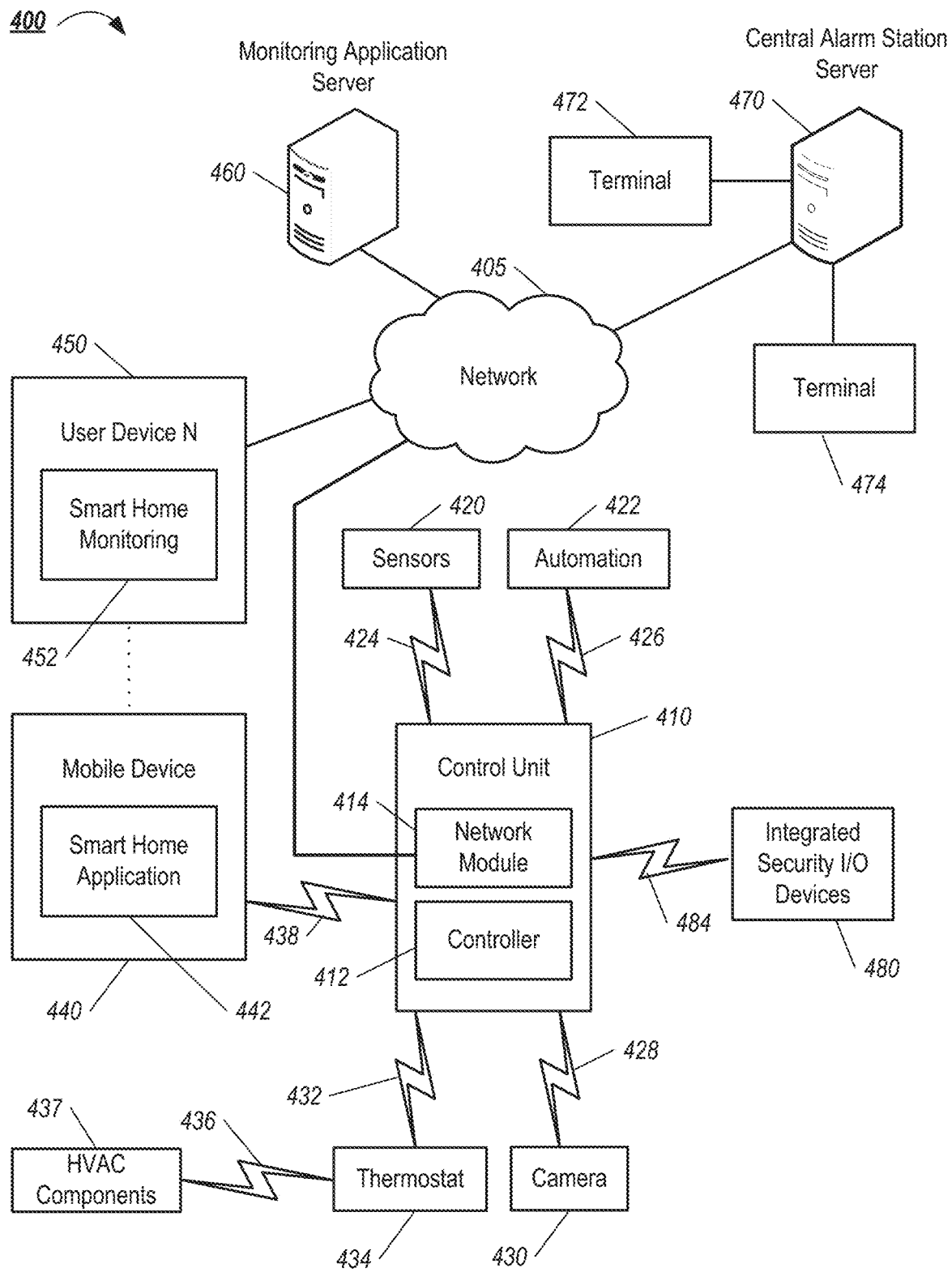
FIG. 4 is a block diagram of an example security monitoring system.

Embodiments and all of the functional operations and/or actions described in this specification may be implemented in the example security monitoring system 400 shown in FIG. 4. The electronic system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications, such as alert message or location data provided by a tracker, between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voiceband modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. In some examples, the sensors 420 may include a radio-frequency identification (RFID) sensor that identifies a particular article that includes a pre-assigned RFID tag.

The control unit 410 communicates with the module 422 and the camera 430 to perform monitoring. The module 422 is connected to one or more devices that enable asset tracking as described in the implementations above. Also, the module 422 may be connected to one or more electronic locks at a user's property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an asset. The camera 430 may be configured to capture single, static images of the asset and also video images of the asset in which multiple images of the asset are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 or a processing server over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434.

A module 437 is connected to one or more components of an HVAC system associated with a property, and is configured to control operation of the one or more components of the HVAC system. In some implementations, the module 437 may be configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 400 for use in appropriate circumstances. For instance, a tracker may be associated with the monitoring system 400 as one of the robotic devices and may be controlled to take action responsive to monitoring system events.

In some examples, the robotic devices automatically navigate within a geographic area. In these examples, the robotic devices include sensors and control processors that guide movement of the robotic devices within the area. For instance, the robotic devices may navigate within the area using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the area. For instance, the robotic devices may store a map, navigation guide, or building plans that enable the robotic devices to navigate the area. During initial configuration, the robotic devices may receive the data describing attributes of the area, determine a frame of reference to the data (e.g., a home or reference location in the area), and navigate the area based on the frame of reference and the data describing attributes of the area. Further, initial configuration of the robotic devices also may include learning of one or more navigation patterns in which a user provides input to control the robotic devices to perform a specific navigation action (e.g., fly to a particular building or location and return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the area and users in the area. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 410, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 410. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 400. For instance, after completion of a monitoring operation or upon instruction by the control unit 410, the robotic devices may be configured to automatically fly to and land on one of the charging stations. In this regard, the robotic devices may automatically maintain a fully charged battery in a state in which the robotic devices are ready for use by the monitoring system 400.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices 480 may include any type of device, such as the tracker, used to provide or receive alerts based on received sensor data. For instance, the one or more control units 410 may receive one or more alerts from the one or more integrated security input/output devices. Additionally, the one or more control units 410 may receive one or more sensor data from the sensors 420 and determine whether to provide an alert to the one or more integrated security input/output devices 480.

The sensors 420, the module 422, the camera 430, the thermostat 434, and the integrated security devices 480 communicate with the controller 412 over communication links 424, 426, 428, 432, 484, and 586. The communication links 424, 426, 428, 432, 484, and 586 may be a wired or wireless data pathway configured to transmit signals from the sensors 420, the module 422, the camera 430, the thermostat 434, and the integrated security devices 480 to the controller 412. The sensors 420, the module 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 484, and 586 may include a local network. The sensors 420, the module 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring application server 460 or processing server is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 610. In this example, the monitoring application server 660 may exchange electronic communications with the network module 414 included in the control unit 410 to receive information regarding events (e.g., alerts) detected by the control unit server 104a. The monitoring application server 460 also may receive information regarding events (e.g., alerts) from the one or more user devices 440 and 450 or the integrated security devices 480.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the control unit 410 or the one or more user devices 440 and 450.

The central alarm station server 470 is an electronic device configured to provide alarm monitoring service by exchanging communications with the control unit 410, the one or more mobile devices 440 and 450, the integrated security devices 480, and the monitoring application server 460 over the network 405. For example, the central alarm station server 470 may be configured to monitor alerting events. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating movement of an asset. The central alarm station server 470 may receive the alerting data and route the alerting data to the terminal 472 for processing by an operator associated with the terminal 472. The terminal 472 may render a display to the operator that includes information associated with the alerting event and the operator may handle the alerting event based on the displayed information.

In some implementations, the terminals 472 and 474 may be mobile devices or devices designed for a specific function. The one or more user devices 440 and 450 are devices that host and display user interfaces. For instance, the user device 440 is a mobile device that hosts one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system. In some cases, the smart home application 442 may allow a user to alerts regarding any asset movement.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart home user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Zwave, Zigbee, HomePlug (ethernet over powerline), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 only includes the one or more user devices 440 and 450, the sensors 420, the module 422, the camera 430, and the robotic devices. The one or more user devices 440 and 450 receive data directly from the sensors 420, the module 422, the camera 430, and the robotic devices and sends data directly to the sensors 420, the module 422, the camera 430, and the robotic devices. The one or more user devices 440, 450 provide the appropriate interfaces/processing to provide visual surveillance and reporting.

In some implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In some implementations, the sensors 420, the module 422, the camera 430, the thermostat 434, and the robotic devices (or a component, such as a bridge/router) are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "Away" state, but set not to capture images when the alarm system is armed in a "Stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A method to track an asset, the method comprising:
receiving a communication signal from a security system over a short distance wireless network;
based on receiving the communication signal, determining to operate a tracker coupled to the asset in a first operation mode;
determining, in the first operation mode, that another communication signal has not been received for a particular period of time after receiving the communication signal;
in response to the determining that another communication signal has not been received for the particular period of time after receiving the communication signal, configuring the tracker to operate in a second operation mode different from the first operation mode;
activating, in the second operation mode, a motion sensor to detect movement of the asset;
determining an amount of motion of the asset using the motion sensor or a speed of the asset;
transmitting data that indicates the amount of motion of the asset determined by the motion sensor to the security system over a second network different from the short distance wireless network;
determining that the speed of the asset satisfies a speed threshold or that the amount of motion of the asset satisfies a movement threshold;
in response to determining that the speed of the asset satisfies the speed threshold or that the amount of motion of the asset satisfies the movement threshold, configuring the tracker to operate in an alarm mode; and
in the alarm mode, periodically transmitting real-time location information of the asset to the security system over the second network.

2. The method of claim 1, wherein:
the first operation mode is a disarmed mode; and
the second operation mode is an armed mode.

3. The method of claim 2, comprising:
obtaining location information of the asset using a global positioning system device;

transmitting the location information of the asset with the data that indicates the amount of motion of the asset; and while operating in the first operation mode:
periodically transmitting communication signals over the short distance wireless network to a device associated with the security system;
receiving a response message from the device associated with the security system over the short distance wireless network;
based on receiving the response message, determining that the asset is within a threshold distance of the device associated with the security system; and
determining to maintain the tracker in the first operation mode.

4. The method of claim 1, wherein:
the short distance wireless network comprises a Bluetooth network; and
the second network comprises a cellular network.

5. The method of claim 1, comprising:
after configuring the tracker to operate in the second operation mode, receiving a second communication signal over the short distance wireless network; and
in response to receiving the second communication signal, configuring the tracker to operate in the first operation mode.

6. The method of claim 1, comprising:
transmitting a cellular signal comprising real time location information simultaneously while listening for communication signals; and
in response to receiving a second communication signal, configuring the tracker to operate in the first operation mode.

7. A tracking device configured to track an asset, the tracking device comprising:
a radio module configured to communicate with a computing device and to receive a communication signal from the computing device over a short distance wireless network; and
a processor configured to:
operate the tracking device in a first operation mode based on receiving the communication signal through the radio module;
determine, in the first operation mode, that another communication signal has not been received for a particular period of time after receiving the communication signal through the radio module;
operate the tracking device in a second operation mode different from the first operation mode in response to the determining that another communication signal has not been received for the particular period of time after receiving the communication signal;
activate, in the second operation mode, a motion sensor to detect movement of the asset;
determine an amount of motion of the asset using the motion sensor or a speed of the asset;
transmit data that indicates the amount of motion of the asset determined by the motion sensor to the computing device using the radio module and over a second network different from the short distance wireless network;
determine that the speed of the asset satisfies a speed threshold or that the amount of motion of the asset satisfies a movement threshold;
operate the tracking device in an alarm mode in response to determining that the speed of the asset satisfies the speed threshold or that the amount of motion of the asset satisfies the movement threshold; and
in the alarm mode, periodically transmit real-time location information of the asset to the computing device over the second network using the radio module.

8. The tracking device of claim 7, wherein:
the first operation mode is a disarmed mode; and
the second operation mode is an armed mode.

9. The tracking device of claim 7, wherein the processor is configured to:
obtain location information of the asset using a global positioning system device;
transmit the location information of the asset with the data that indicates the amount of motion of the asset; and
while operating in the first operation mode, the processor is configured to:
periodically transmit communication signals over the short distance wireless network to the computing device;
receive a response message from the computing device through the short distance wireless network and the radio module;
determine that the asset is within a threshold distance of the computing device based on receiving the response message; and
determine to maintain the tracking device in the first operation mode.

10. The tracking device of claim 7, wherein:
the short distance wireless network comprises a Bluetooth network; and
the second network comprises a cellular network.

11. The tracking device of claim 7, wherein:
the radio module is configured to receive a second communication signal over the short distance wireless network; and
the processor is configured to operate the tracking device in the first operation mode in response to receiving the second communication signal through the radio module.

12. The tracking device of claim 7, wherein:
the radio module is configured to transmit a cellular signal comprising real time location information simultaneously while listening for communication signals; and
the processor is configured to operate the tracking device in the first operation mode in response to receiving a second communication signal through the radio module.

13. A non-transitory computer-readable storage medium including instructions that, when executed by one or more processors, cause the one or more processors to perform operations comprising:
receiving a communication signal from a security system over a short distance wireless network;
based on receiving the communication signal, determining to operate a tracker coupled to an asset in a first operation mode;
determining, in the first operation mode, that another communication signal has not been received for a particular period of time after receiving the communication signal;
in response to the determining that another communication signal has not been received for the particular period of time after receiving the communication signal, configuring the tracker to operate in a second operation mode different from the first operation mode;

activating, in the second operation mode, a motion sensor to detect movement of the asset;

determining an amount of motion of the asset using the motion sensor or a speed of the asset;

transmitting data that indicates the amount of motion of the asset determined by the motion sensor to the security system over a second network different from the short distance wireless network;

determining that the speed of the asset satisfies a speed threshold or that the amount of motion of the asset satisfies a movement threshold;

in response to determining that the speed of the asset satisfies the speed threshold or that the amount of motion of the asset satisfies the movement threshold, configuring the tracker to operate in an alarm mode; and in the alarm mode, periodically transmitting real-time location information of the asset to the security system over the second network.

14. The non-transitory computer-readable storage medium of claim 13, wherein:

the first operation mode is a disarmed mode;

the second operation mode is an armed mode;

the short distance wireless network comprises a Bluetooth network; and the second network comprises a cellular network.

15. The non-transitory computer-readable storage medium of claim 13, wherein the operations comprise:

obtaining location information of the asset using a global positioning system device;

transmitting the location information of the asset with the data that indicates the amount of motion of the asset; and while operating in the first operation mode:

periodically transmitting communication signals over the short distance wireless network to a device associated with the security system;

receiving a response message from the device associated with the security system over the short distance wireless network;

based on receiving the response message, determining that the asset is within a threshold distance of the device associated with the security system; and determining to maintain the tracker in the first operation mode.

16. The non-transitory computer-readable storage medium of claim 13, wherein the operations comprise:

after configuring the tracker to operate in the second operation mode, receiving a second communication signal over the short distance wireless network; and in response to receiving the second communication signal, configuring the tracker to operate in the first operation mode.

17. The non-transitory computer-readable storage medium of claim 13, wherein the operations comprise:

transmitting a cellular signal comprising real time location information simultaneously while listening for communication signals; and in response to receiving a second communication signal, configuring the tracker to operate in the first operation mode.

* * * * *